United States Patent [19]
Riley

[11] 3,802,233
[45] Apr. 9, 1974

[54] VEHICLE THEFT PREVENTION SYSTEM

[76] Inventor: Willis Robert Riley, 10418 S. Vanness Ave., Los Angeles, Calif. 90047

[22] Filed: Apr. 13, 1973

[21] Appl. No.: 351,079

[52] U.S. Cl. .................. 70/241, 70/139, 200/61.68, 292/218
[51] Int. Cl. ....................... B60r 25/04, E05b 65/19
[58] Field of Search ............ 70/240, 241; 200/61.68

[56] References Cited
UNITED STATES PATENTS

| | | | |
|---|---|---|---|
| 1,448,836 | 3/1923 | Fisher | 70/240 |
| 1,554,126 | 9/1925 | Pinkerton | 70/241 |
| 1,598,529 | 8/1926 | Knight | 70/241 |
| 3,133,168 | 5/1964 | Jacobson | 200/61.68 |
| 3,744,285 | 7/1973 | Barmherzig | 70/241 |

*Primary Examiner*—Albert G. Craig, Jr.

[57] ABSTRACT

A vehicle theft prevention system for locking the hood of a motor vehicle while simultaneously disconnecting the vehicle battery from the vehicle electrical circuitry. A locking shaft member is movable by insertion of a key in a lock mounted on a vehicle hood. A plate member mounted on the shaft prevents the vehicle hood from being raised when the shaft is in a first position, and enables the hood to be raised when the shaft is moved to a second position. An electrical switch armature is mounted on a second shaft for disconnecting the vehicle battery from the vehicle electrical circuitry when the shaft is in the first position and connecting the vehicle battery to the vehicle electrical circuitry when the shaft is in a second position. The electrical switch armature interconnects a pair of terminal members formed of flared spring fingers which provide an interconnection between portions of the battery cable when it is desired to operate the vehicle. The first and second shafts are gauged to rotate together by a separable interconnection for enabling the hood to be raised when the vehicle engine is running.

7 Claims, 5 Drawing Figures

PATENTED APR 9 1974 3,802,233

VEHICLE THEFT PREVENTION SYSTEM

BACKGROUND OF THE INVENTION

1. Field of the Invention

The field of art to which the invention pertains relates to vehicle theft prevention systems, particularly with respect to a locking mechanism for locking the hood of a vehicle while simultaneously disconnecting the vehicle battery from the vehicle electrical circuitry.

2. Description of the Prior Art

Conventional hood-locking mechanisms are primarily comprised of interconnecting devices which are mounted on the interior dashboard of a vehicle. By complex linkages, the locking mechanism passes through the vehicle fire wall into the engine portion of the vehicle and hence is used to lock the vehicle hood from the interior of the vehicle. Such locking mechanisms require relatively complex structures in order to transmit the locking mechanism through the vehicle fire wall from the interior of the vehicle. In addition, certain of these hood-locking mechanisms are also utilized to disconnect the vehicle ignition circuit when the vehicle hood is locked. Such a system prevents the hood from being raised or should the hood be raised, by breaking of the locking mechanism, it is difficult for a thief to reconnect the ignition circuit unless he is aware of where the mechanism has disconnected the ignition circuit. In cases where the thief has broken into the vehicle, dismantled the hood-locking mechanism and is experienced enough to determine where the ignition circuit is broken, a simple jumper wire can be utilized to reconnect the ignition circuit and hence steal the vehicle.

Other hood-locking mechanisms utilize a key lock which is positioned directly on the vehicle hood. When the key is rotated to the locking position, a mounting member locks the hood to the vehicle chassis and the hood cannot be opened except by rotation of the lock. Typically, such locking mechanisms are positioned forward of the vehicle hood and are not near the ignition circuit of the vehicle. Thus, should the vehicle hood lock be opened, it is relatively easy for an experienced thief to start the vehicle without a key.

Known prior art includes U.S. Pat. Nos. 1,481,498; 1,575,501; 1,725,158; 2,105,912; 1,829,784; and 3,415,086.

In order to overcome the attendant disadvantages of prior art vehicle theft prevention systems, the present invention provides a relatively simple hood-locking mechanism which is mounted directly on the hood and which requires a minimum vehicle modification for installation. The theft prevention system also provides a switching mechanism for disconnecting the battery cable from the vehicle ignition circuit so that the vehicle hood if opened would still not enable a thief to start the vehicle unless he were aware of the modification.

SUMMARY OF THE INVENTION

A vehicle theft prevention system for locking the hood of a motor vehicle while simultaneously disconnecting the vehicle battery from the vehicle electrical circuitry. A locking shaft member is movable by insertion of a key in a lock mounted on the vehicle hood. A plate member is mounted on the shaft for preventing the vehicle hood from being raised when the shaft is moved to a first position, and enabling the hood to be raised when the shaft is moved to a second position. Switching means is mounted on the shaft for disconnecting the vehicle battery from the vehicle electrical circuitry when the shaft is in the first position. When the shaft is in the second position, the vehicle battery is connected to the vehicle electrical circuit.

The advantages of this invention, both as to its construction and mode of operation, will be readily appreciated as the same becomes better understood by reference to the following detailed description when considered in connection with the accompanying drawings in which like reference numerals designate like parts throughout the figures.

DESCRIPTION OF THE PREFERRED EMBODIMENT

Figure 1:
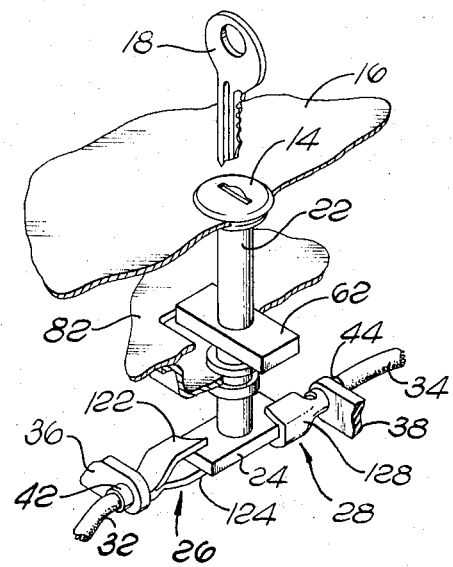
FIG. 1 is a fragmentary perspective view of a portion of a vehicle containing the theft prevention system in accordance with the invention.

Referring now to the drawings there is shown in FIG. 1 a vehicle theft prevention system constructed in accordance with the principles of the invention. A key lock 14 is illustrated mounted on a vehicle hood 16 and can be operated by insertion of a key 18. The key is used to rotate a shaft 22 connected to the key lock 14. In the position shown in FIG. 1, the lock 14 is in an unlocked position enabling the vehicle hood 16 to be raised. Rotation of the shaft 22 also moves an armature 24 which interconnects a first terminal member 26 with a second terminal member 28.

In the position shown in FIG. 1, the armature 24 electrically interconnects the terminals 26 and 28, with one of the terminals 26 in turn being connected by means of a conductor 32 to a vehicle battery (not shown). The conductor 34 in turn is used to interconnect the terminal 28 to the vehicle electrical circuitry. The terminal members 26 and 28 are normally fastened to portions of the vehicle by means of mounting brackets 36 and 38 secured to the terminal ends of the terminal members 26 and 28. The terminal ends 42 and 44, respectively, of terminals 26 and 28 are shown crimped to the conductors 32 and 34, respectively.

Figure 2:
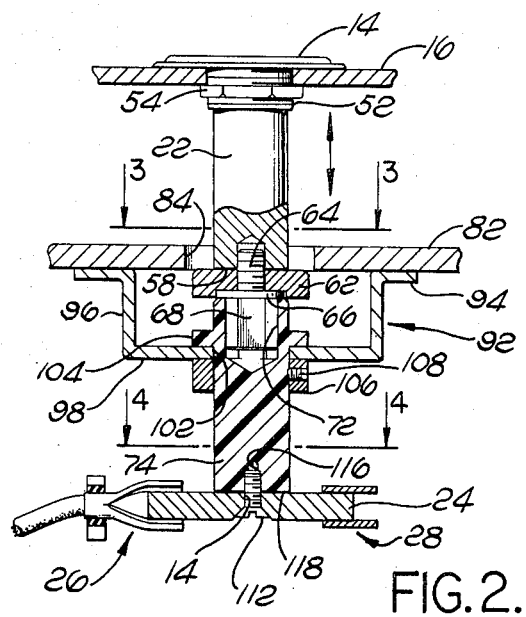
FIG. 2 is a cross-sectional view of the theft prevention system illustrating the locking mechanism.

Referring now to FIG. 2, the locking mechanism is shown in greater detail in cross-sectional view. The shaft member 22 is threaded at its end 52 adjacent the key lock 14 enabling the shaft to be secured beneath the vehicle hood by means of a fastening nut 54. The barrel of the key lock (not shown) is positioned in the shaft within the threaded end 52. The bottom end 58 of the shaft 22 has a rectangular locking plate 62. A bolt 64 extends through the plate 62 and into the shaft 22, securing the plate 62 to the shaft 22. The bottom of the bolt contains an enlarged head 66 whose bottom surface is flush with the bottom surface of the plate 62. A hexagonal shaped nut 68 integral with the head 66, extends in a downward direction and forms a tight fit with a hexagonally shaped opening 72 formed in a switch shaft 74. The switch shaft 74 is directly below and axially aligned with the shaft 22. The switch shaft is normally made of insulating material.

A portion of the vehicle chassis 82 which is formed in a plane parallel to the locking plate 62 contains a rectangular aperture 84 through which the plate 62 can pass. When the vehicle lock is in the position shown in FIG. 1, the hood 16 can be raised, while the electrical circuitry of the vehicle is connected to the battery by means of the armature 24. It should be noted in FIG. 1 that the plate 62 and hood 16 are shown with the hood slightly raised ajar and not in the normal driving position where the hood is securely latched by means of a typical hood latch (not shown).

Figure 3:
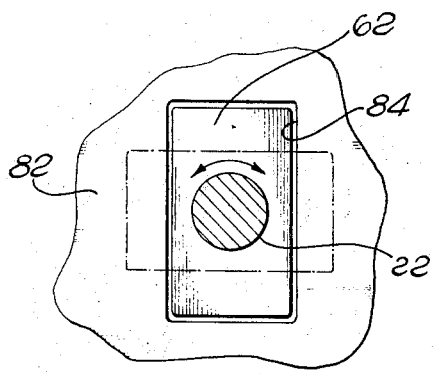
FIG. 3 is a fragmentary cross-sectional view of the hood locking plate of the locking mechanism, illustrating the various positions of the plate taken along the line 3—3 of FIG. 2.

Referring now to FIG. 3, the locking plate 62 is illustrated in solid lines in a position where the hood 16 can be raised. However, as can be readily seen, the aperture 84 is such that when the locking plate 62 is rotated as shown in dotted lines by insertion of the key 18 into the lock 14, the plate 62 is positioned below the chassis 82 so that the vehicle hood cannot be raised.

A cup-shaped member 92 contains an outer flange lip 94 which is secured to the bottom surface of the chassis member 82 by welding or other conventional securing techniques. The cup-shaped member contains a cylindrical side wall 96 and a bottom wall 98 integral therewith. The bottom wall 98 has a central opening 102 through which the shaft 74 extends. A flange member 104 is formed on the shaft 74 directly above the top surface of the bottom wall 98. In addition, a cylindrical locking member 106 surrounds the shaft 74 with its top surface abutting the bottom surface of the bottom wall 98 of the cup-shaped member 92. The locking member 106 can be secured to the shaft 74 by means of a conventional set screw 108. Thus, the shaft 74 is secured to the cup-shaped member 92 by means of the flange member 104 and the locking member 106, but can rotate within the opening 102 in the member 92.

Figure 4:
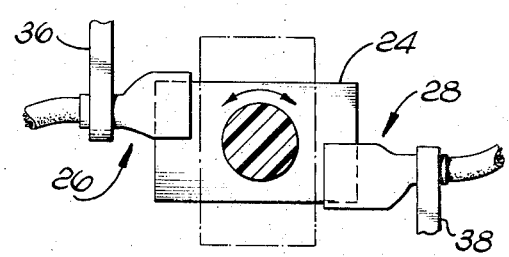
FIG. 4 is a view, partly in section, of a portion of the theft prevention system used to illustrate the operation of the electrical switching portion of the system taken along the line 4—4 of FIG. 2.

The armature 24 has a central opening 114 through which a screw or bolt 112 protrudes and extends into an opening 116 formed in the bottom surface 118 of the shaft 74, thus securing the armature to the shaft. Each of the terminal members 26 and 28 is identical and is generally of a U-shaped configuration. The terminal members are formed of outwardly flared side walls 122 and 124 which taper inwardly to a central interconnecting wall 128. The flared side walls enable the armature plate 24 to be rotated from a position shown in dotted lines in FIG. 4, to a position shown in solid lines in FIG. 4 where the terminals are connected by means of the armature plate 24.

Figure 5:
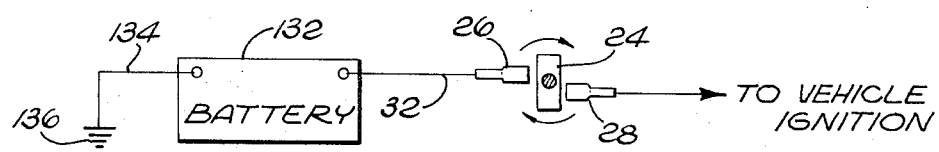
FIG. 5 is a schematic illustration of the electrical switching portion of the system.

As illustrated in FIG. 5, the vehicle battery 132 is connected from one terminal to a conductor 134 to a ground 136. The other battery terminal is connected by the conductor 32 to the terminal member 26. Rotation of the key lock 14 enables the armature plate 24 to interconnect the terminals 26 and 28, thus connecting the battery 132 to the vehicle circuitry. When the vehicle is inoperative and it is desired to leave the hood in a locked position, the key is rotated so that the plate 62 is positioned beneath the chassis portion 82 and the hood cannot be opened. In this position, the armature plate 24 disconnects the battery from the vehicle circuitry and the automobile cannot be started. When the vehicle lock is rotated, the armature plate 24 is connected to the terminals 26 and 28.

The interlocking arrangement of the shafts 22 and 74 by means of the hex head 68 positioned in the hexagonal-shaped opening 72 enables conventional routine maintenance to be performed on the engine. Thus, in the unlocked position shown in FIG. 1, the hood can be raised with the battery connected via the terminals 26 and 28 to the vehicle ignition circuitry. Further, when the hood is closed, the hex-shaped head is again positioned in the opening 72, enabling simultaneous rotation of the shafts 22 and 74.

The armature 24 is illustrated connecting the battery 132 to the vehicle ignition. It should be understood that the armature could alternatively be used to connect the battery to the ground 136.

I claim:

1. A vehicle theft prevention system for locking the hood of a motor vehicle while simultaneously disconnecting the vehicle battery from the vehicle electrical circuitry comprising:
    a shaft member movable by insertion of a key in a lock mounted on the vehicle hood;
    a plate member secured to said shaft for preventing the vehicle hood from being raised when said shaft is moved to a first position and enabling said hood to be raised when said shaft is moved to a second position; and
    switching means mounted on said shaft for disconnecting said vehicle battery from said vehicle electrical circuitry when said shaft is in a first position and connecting said vehicle battery to said vehicle electrical circuitry when said shaft is in a second position.

2. Apparatus in accordance with claim 1 wherein said plate is positioned in an opening formed in said vehicle chassis when said shaft is in said first position.

3. A vehicle theft prevention system in accordance with claim 1 wherein said switching means comprises an armature interconnecting a pair of terminal members to said battery when said shaft is in said second position.

4. A vehicle theft prevention system in accordance with claim 3 wherein said terminal members contain spring members for electrical connection to said armature.

5. A vehicle theft prevention system in accordance with claim 4 wherein said spring members are flared for gradual insertion of said armature upon rotation of said shaft to said second position.

6. A vehicle theft prevention system in accordance with claim 5 wherein portions of said shaft which is connected to said armature is made of insulating material for preventing short circuitry of said battery through said shaft.

7. A vehicle theft prevention system in accordance with claim 6 wherein said shaft is separable for enabling said armature to interconnect said terminal members while simultaneously enabling said hood to be raised when said shaft is in said second position.

* * * * *